US007552293B2

United States Patent
Van Riel et al.

(10) Patent No.: US 7,552,293 B2
(45) Date of Patent: Jun. 23, 2009

(54) KERNEL AND APPLICATION COOPERATIVE MEMORY MANAGEMENT

(75) Inventors: Henri Han Van Riel, Westford, MA (US); Matthias Clasen, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 241 days.

(21) Appl. No.: 11/363,158

(22) Filed: Feb. 28, 2006

(65) Prior Publication Data

US 2007/0204117 A1    Aug. 30, 2007

(51) Int. Cl.
    G06F 12/08    (2006.01)
    G06F 12/12    (2006.01)
(52) U.S. Cl. ............... 711/159; 711/203; 711/E12.069; 711/E12.07
(58) Field of Classification Search ................ 711/159, 711/203, E12.069, E12.07
    See application file for complete search history.

(56) References Cited

U.S. PATENT DOCUMENTS

| 4,939,509 | A  | * | 7/1990  | Bartholomew et al. | ....... | 345/2.2  |
| 6,636,874 | B1 | * | 10/2003 | Douceur et al.     | ......... | 707/201 |
| 7,065,676 | B1 | * | 6/2006  | Lang et al.        | ............ | 714/33  |
| 7,176,589 | B2 | * | 2/2007  | Rouquette          | ............ | 307/17  |
| 7,301,658 | B2 | * | 11/2007 | Henry              | ........................ | 358/1.15 |
| 2003/0065688 | A1 | * | 4/2003  | Dageville et al.   | ........... | 707/205 |
| 2004/0073763 | A1 | * | 4/2004  | Dageville et al.   | ........... | 711/170 |

OTHER PUBLICATIONS

Microsoft Computer Dictionary, fifth edition, "autopolling" entry, Microsoft Press, 2002.*

* cited by examiner

*Primary Examiner*—Shane M Thomas
*Assistant Examiner*—John P Fishburn
(74) *Attorney, Agent, or Firm*—MH2 Technology Law Group LLP

(57) ABSTRACT

Embodiments of the present invention provide a mechanism for an operating system and applications to cooperate in memory management. Applications register with the operating system for cooperative memory management. The operating system monitors the memory and determines a memory "pressure" related to the amount of demand for the memory. As the memory pressure increases, the operating system provides a memory pressure signal as feedback to the registered applications. The operating system may send this signal to indicate it is about to commence evicting pages from the memory or when it has commenced swapping out application data. In response to the signal, the registered applications may evaluate the memory pressure, determine which data should be freed, if any, and provide this information back to the operating system. The operating system may then free those portions of memory relinquished by the applications. By releasing data the system may thus avoid swapping and increase its performance.

9 Claims, 4 Drawing Sheets

KERNEL AND APPLICATION COOPERATIVE MEMORY MANAGEMENT

FIELD OF THE INVENTION

The present invention relates generally to computer memory management. More particularly, the present invention relates to kernel and application cooperative memory management.

BACKGROUND OF THE RELATED ARTS

Memory management is one of the most fundamental issues of modern computer systems. Typically, a computer system will include a hierarchy of memory that ranges from a small, fast cache of main memory that is placed in front of a larger, but slower, auxiliary memory. The cache is generally implemented using a physical memory, such as RAM, while the auxiliary memory is implemented using a storage device, such as a disk drive or hard disk. Both memories are usually managed in uniformly sized units known as pages.

In order to improve performance, many computers and operating systems today implement virtual memory for the applications running on the computer. Virtual memory is where the computer system emulates that it has more physical memory than the computer system actually possesses. For example, most computer systems utilize 32-bit processors. Hence, a computer system is theoretically capable of providing a virtual memory of approximately $2^{32}$ bits or approximately 4 Gigabytes, even though the physical memory is usually much smaller.

In order to provide a virtual memory of this size, the computer system runs the application or process in a memory address space that is virtual, i.e., not tied to the physical memory. The computer system will then swap pages in and out of a cache in its physical memory in order to emulate the virtual memory. During operation, an application or process will continually requests pages using virtual memory addresses. In response, the computer system will translate the virtual memory address into a physical memory address and determine if the page is present in the cache (i.e., the page is resident). When a requested page is not present in the cache, it is called a cache "miss" (or page fault), and the requested page must be retrieved from storage. However, when the cache is full, before a new page can be brought into the cache, another page (known as the victim page) must be evicted to storage. Typically, an operating system will use a global page replacement algorithm, such as "least recently used," to share its physical memory with multiple algorithms.

Unfortunately, the use of virtual memory by operating systems makes applications unaware of the competition for space in the physical memory. That is, conventional operating systems will unilaterally determine how to manage the physical memory. Applications are thus forced to trust that the operating system can efficiently manage its physical memory for them.

However, in modern computing environments, applications utilize a large amount of their virtual memory. For example, applications, such as web browsers and database applications, often use large amounts of their virtual memory for uncompressed data. In addition, the workloads of many applications, such as interactive applications, can be unpredictable and cause the operating system to consume most or all of its physical memory. This can result in heavy paging activity by the operating system between its memory and secondary storage in order swap in/out pages for the applications.

Paging activity seriously degrades the performance of applications, because the cost of I/O between memory and storage is quite high. In many instances, an application could have performed better by freeing some of its memory before heavy paging activity by the operating system. For example, it is often faster for an application to recalculate/reprocess its cached data than to swap it out and back from storage. In particular, a web browser can often decompress an image much faster than having it paged out and back from storage. In general, applications are in the better position to determine which of their data should be swapped in/out or freed and reprocessed. However, as noted above, conventional operating systems manage memory unilaterally, without the cooperation of the applications.

Accordingly, it would be desirable to provide a mechanism in which applications and an operating system could efficiently share memory. It would also be desirable to provide mechanisms in which an operating system and applications could cooperatively manage the memory of the computer system.

SUMMARY

In accordance with one feature of the invention, a method is provided for providing a feedback signal that indicates a memory pressure in a computer system. A memory pressure on a physical memory in the computer system is determined and a feedback signal indicating the memory pressure is determined. Applications running on the computer system that have registered for the signal are identified. The feedback signal is then provided to the registered applications.

In accordance with another feature of the invention, a method for an application to cooperate with an operating system is provided. The operating system provides the application a virtual memory and maps at least a portion of the virtual memory to a physical memory. A feedback signal is received from the operating system and indicates a memory pressure on the physical memory. The application determines a cost of freeing at least some of its virtual memory based on the memory pressure. The application then may release at least some of its virtual memory based on the cost of freeing and the feedback signal.

In accordance with another feature of the invention, a method of managing a physical memory in a computer system is based on cooperation between the operating system and applications running on the computer system. The operating system determines a memory pressure on the physical memory. One or more applications register with the operating system and are configured to cooperate with the operating system. A feedback signal is sent to the registered applications and indicates the memory pressure. Portions of the physical memory that have been freed by the registered applications may then be released back to the operating system.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a mechanism for an operating system and applications to cooperate in memory management. In some embodiments, applications can register with the operating system for cooperative memory management. The operating system monitors the memory and determines a memory "pressure" related to the amount of demand for the memory. As the memory pressure increases, the operating system provides a memory pressure signal as feedback to the registered applications. The operating system may send this signal to indicate it is about to commence evicting pages from the memory or when it has commenced swapping out application data. In response to the signal, the registered applications may evaluate the memory pressure, determine which data should be freed, if any, and provide this information back to the operating system. The operating system may then free those portions of memory relinquished by the applications.

Figure 1:
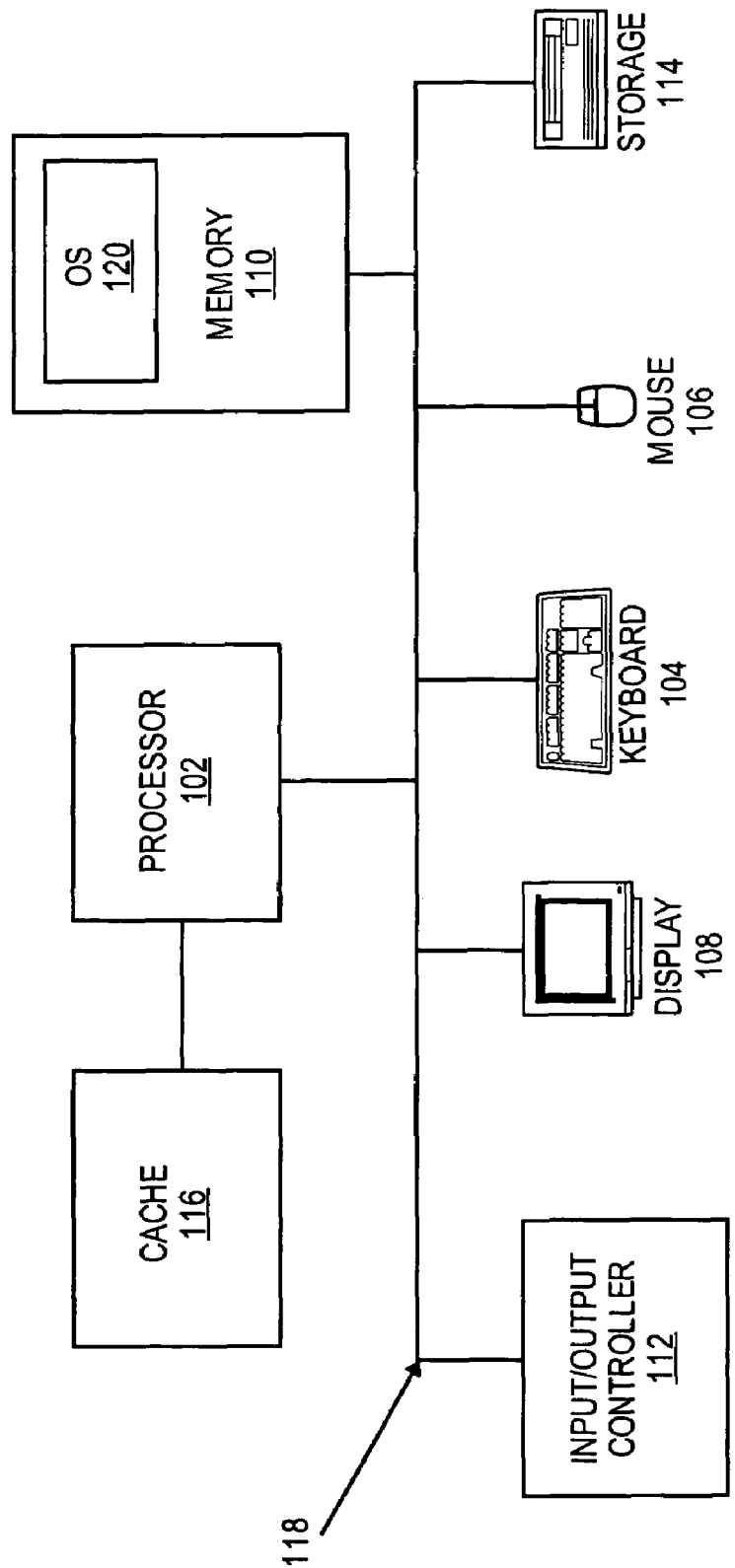
FIG. 1 illustrates an exemplary system that is in accordance with embodiments of the present invention.
Figure 2:
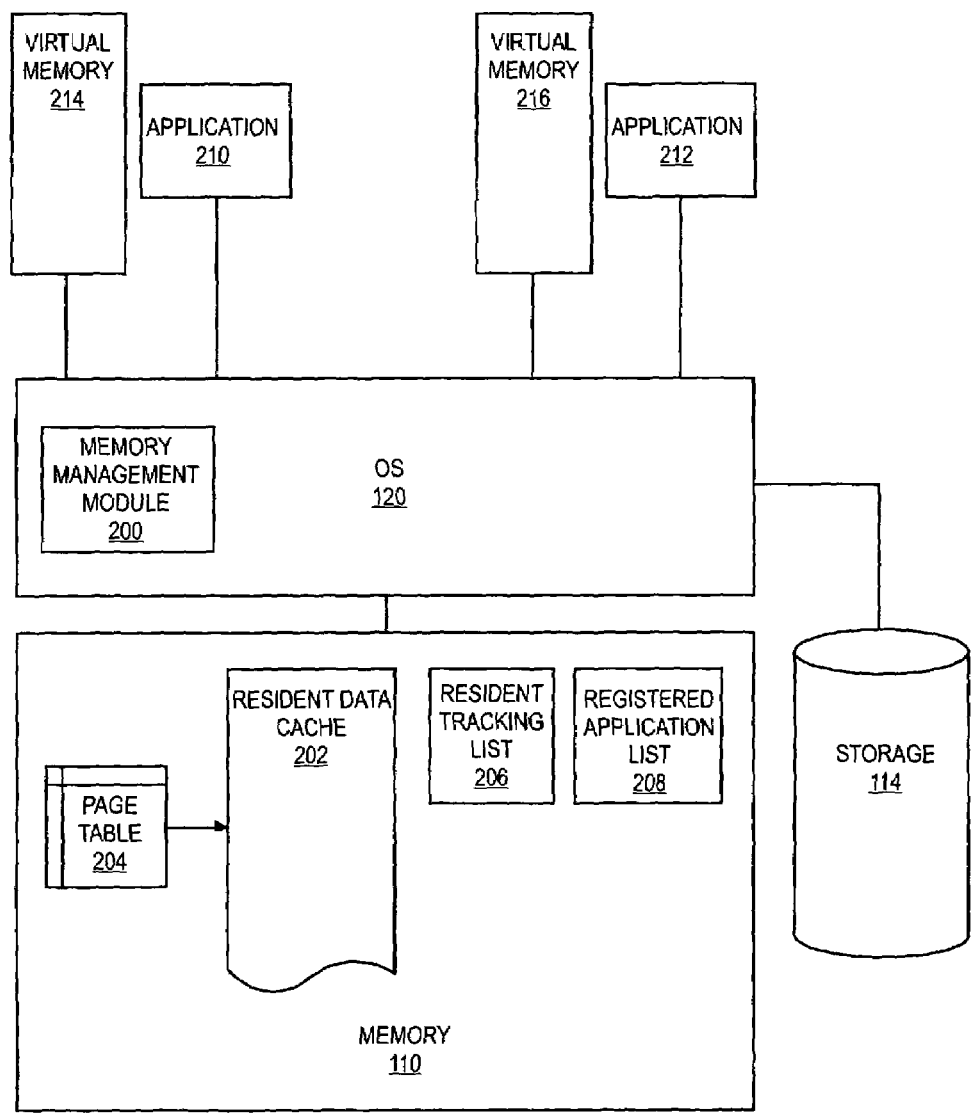
FIG. 2 illustrates an exemplary architecture of the system shown in FIG. 1.
Figure 3:
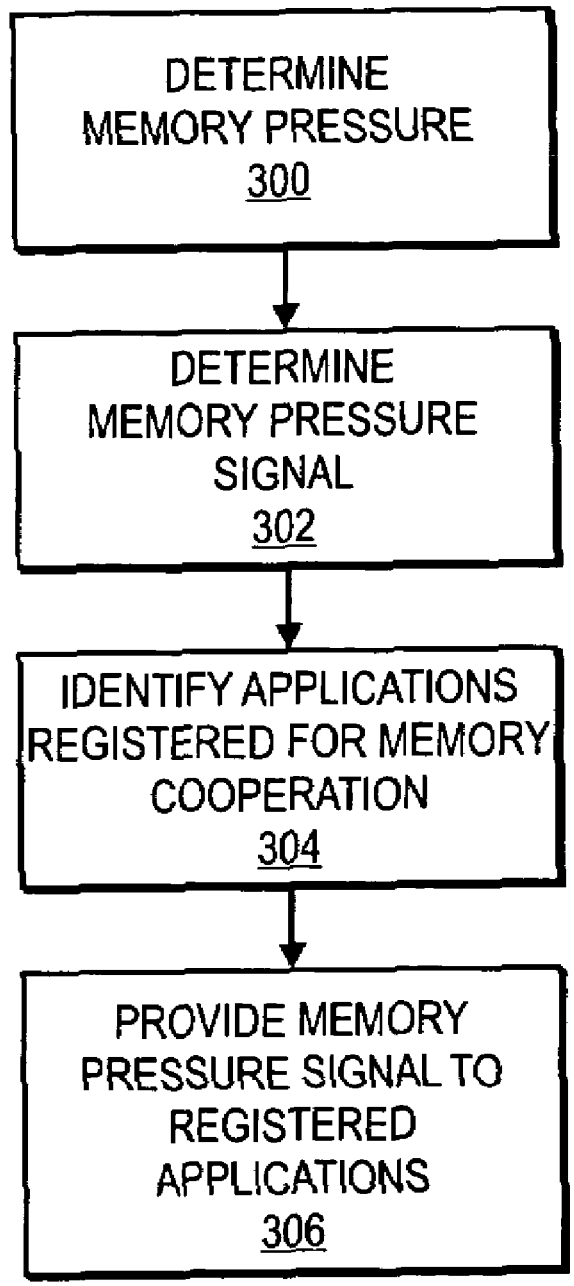
FIG. 3 illustrates an exemplary process flow for an operating system to cooperate with one or more applications that is in accordance with embodiments of the present invention.
Figure 4:
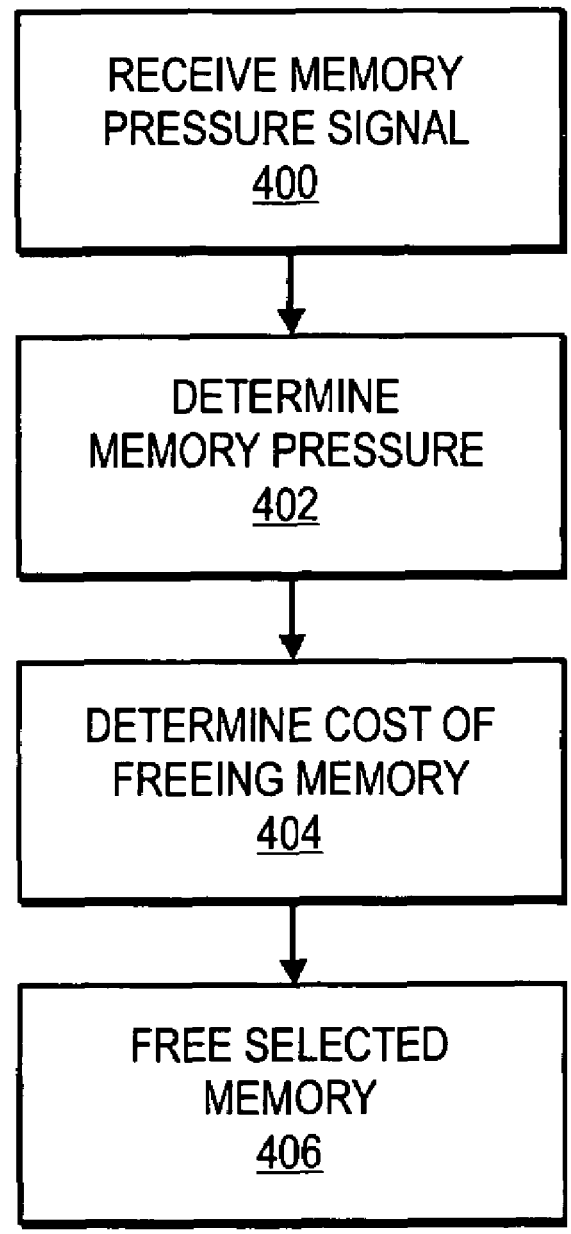
FIG. 4 illustrates an exemplary process flow for an application to cooperate with the operating system in accordance with embodiments of the present invention.

Reference will now be made in detail to exemplary embodiments of the invention, which are illustrated in the accompanying drawings. Wherever possible, the same reference numbers will be used throughout the drawings to refer to the same or like parts. FIGS. 1 and 2 illustrate an exemplary computer system and its architecture in which embodiments of the present invention may be implemented. FIGS. 3 and 4 illustrate exemplary process flows used by the operating system and registered applications to cooperate on the management of the physical memory.

Referring now to FIG. 1, a computer system 100 is shown that is consistent with embodiments of the present invention. In general, embodiments of the present invention may be implemented in various computer systems, such as a personal computer, server, workstation, and the like. However, for purposes of explanation, system 100 is shown as a general purpose computer that is well known to those skilled in the art. Examples of the components that may be included in system 100 will now be described.

As shown, computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

In addition, computer system 100 may include an operating system (OS) 120 that resides in memory 110 during operation. OS 120 is an integrated collection of routines and programs that service sequencing and processing of programs and applications running on computer system 100. OS 120 may provide many services for computer system 100, such as resource allocation, scheduling, input/output control, and memory management. OS 120 may be predominantly software, but may also comprise partial or complete hardware implementations and firmware. Well known examples of operating systems that are consistent with the principles of the present invention include Mac OS by Apple Computer, GNU/LINUX, Java and Sun Solaris by Sun Microsystems, Windows by Microsoft Corporation, Microsoft Windows CE, Windows NT, Windows 2000, and Windows XP. One skilled in the art will recognize that system 100 may comprise various other components, such as multiple processors, additional storage devices, etc. Such components are well known to those skilled in the art.

FIG. 2 illustrates a general architecture of computer system 100 that is in accordance with embodiments of the present invention. As shown, computer system 100 is running an OS 120. OS 120 may comprise various components, which are well known to those skilled. Some of these components will known be further described to illustrate embodiments of the present invention. In particular, OS 120 may comprise a memory management module 200 and utilize a resident data cache 202, a page table 204, a resident tracking list 206, and a registered application list 208. OS 120 may be coupled to storage 114 and retrieve various pages of application data that are not stored in memory 110.

As also shown, OS 120 may support the running of any number of applications. These applications may be user applications, such as applications 210 and 212. Applications 210 and 212 may be any application or process and such applications and processes are well known to those skilled in the art. As part of its support, OS 120 may provide virtual memories for applications 210 and 212, which are respectively shown as virtual memories 214 and 216.

Virtual memories 214 and 216 are the memory spaces addressed by applications 210 and 212 and where these applications cache their data. Accordingly, virtual memories 214 and 216 may also be referred to as the "memories" or "caches" of applications 210 and 212, respectively. However, as noted above, virtual memories 214 and 216 utilize address spaces that are independent of the physical address space of memory 110.

Memory management module 200 provides the mapping and address translation mechanisms by which OS 120 locates those portions of virtual memories 214 and 216 that reside in memory 110. Memory management module 200 also decides which parts of virtual memories 214 and 216 are kept in memory 110 in resident data cache 202 or in storage 114. Memory management module 200 may then swap in/out data between resident data cache 202 and storage 114 as applications 210 and 212 process data in their virtual memories 214 and 216.

Memory management module 200 may operate in conjunction with other components of computer system 100 that are not shown in FIG. 2. For example, memory management module 200 may operate with a memory management unit associated with processor 102 and maintain several data structures for managing memory 110. Some of these data structures are briefly described below.

In addition, memory management module 200 may be configured to monitor the utilization of memory 110 and determine a memory pressure. In particular, as resident data cache 202 is consumed, memory management module 200 may estimate when it is about to commence paging activity. Memory management module 200 may provide a signal to various applications, such as applications 210 and 212, to indicate the memory pressure on memory 110. This signal may be in the form of an asynchronous event sent from OS 120 (such as a UNIX signal or a POSIX real-time signal), or a software interrupt. Alternatively, memory management module 200 may write memory pressure data to a file or device that is polled by various applications, such as applications 210 and 212. Other signaling protocols are well known to those skilled in the art.

The memory pressure signal from memory management module 200 may indicate various parameters. For example, the memory pressure signal may indicate: the total size allocated to resident data cache 202; the amount of free memory in memory 110 or resident data cache 202; the amount of data in the active/inactive lists of resident tracking list 206; and the like. One skilled in the art will recognize that memory pressure signal may be any signal that indicates the status of memory 110 and/or resident data cache 202.

Memory management module 200 may send its memory pressure signal at various times and intervals. For example, memory management module 200 may be configured to continuously send the memory pressure signal at fixed intervals. As another example, as resident data cache 202 or memory 110 are consumed, memory management module 200 may wait until a threshold amount of memory has been consumed before sending the memory pressure signal. This threshold may be set statically, such as at 15% of remaining memory, or dynamically based upon the rate of memory consumption by the applications running. Memory management module 200 may send the memory pressure signal before commencing paging activity or when paging activity has begun.

In addition, memory management module 200 may modulate the frequency that it sends the memory pressure signal. For example, memory management module 200 may send the memory pressure signal more frequently as more of memory 110 or resident data cache 202 has been consumed. As another example, memory management module 200 may use a set of predetermined frequencies based on ranges of utilization such that one frequency indicates no paging, while another frequency indicates paging activity is about to begin, and yet another indicates that paging activity has commenced.

Page table 204 provides a mapping between the virtual address space of virtual memories 214 and 216 and the physical address space of memory 110. In some embodiments, page table 204 may be used in conjunction with a translation lookaside buffer (TLB) (not shown), which are well known to those skilled in art. Typically, page table 204 is accessed by extracting the virtual page frame number and offset of the desired data. The virtual page frame number serves as an index to page table 204 to retrieve a physical page frame number. The physical address may then be determined by multiplying the page size by the physical page frame number and adding the offset (if needed). The use and structure of page table 204 is well known to those skilled in the art. Of course, other mapping schemes may be employed by embodiments of the present invention.

In some embodiments, OS 120 may be configured to use demand paging. Demand paging is where only pages that are currently use by applications 210 or 212 are loaded into memory 110 in resident data cache 202.

Resident tracking list 206 provides memory management module 200 information to determine which pages it should be retained and which may be evicted. Resident tracking list 206 is a list that tracks pages which currently reside in resident data cache 202 and which have been recently accessed by the applications running on OS 120. In some embodiments, resident tracking list 206 may include an active and inactive list such as those employed by the well known "least recently used" algorithms. Hence, when free space must be generated in memory 110, memory management module 204 will evict a page from resident data cache 206 using well known algorithms.

Registered application list 208 indicates processes and applications, such as applications 210 and 212 that are cooperating with OS 120 in managing memory 110. Registered application list 208 may identify various processes and applications using well known identifiers, such as process identifiers, etc. In addition, registered application list 208 may include information that indicates a relative priority assigned to each application registered for cooperation. For example, user interactive applications, such as a browser, may be assigned a higher priority than a background application. This priority may be assigned by OS 120 or self-configured by the applications themselves. Of course, the priority may be statically assigned or dynamic based on the operations system 100.

Alternatively, embodiments of the present invention may also employ a non-registered application list. Applications on this list may be applications that elect to have OS 120 decide unilaterally how to manage their virtual memories.

In some embodiments, memory management module 200 may preferentially manage memory 110 based on the information in registered application list 208. For example, memory management module 200 may first turn to applications that are absent from registered application list 208 for eligible pages to evict. Memory management module 200 may then turn to pages from applications on registered application list as a secondary or last resort. In addition, memory management module 200 may evict pages from applications on registered application list 208 based on the priorities indicated in that list. Of course, memory management module 200 may employ a variety of combinations of preferentially managing memory 110 based on cooperation with some of the applications.

FIG. 3 illustrates an exemplary process flow for OS 120 to cooperate with one or more applications that is in accordance with embodiments of the present invention. It should be readily apparent to those of ordinary skill in the art that the process flow depicted in FIG. 3 represents a generalized schematic illustration and that other stages may be added or existing stages may be removed or modified.

As shown in FIG. 3, in stage 300, OS 120 determines the memory pressure on memory 110. In particular, during normal operation, OS 120 may collect various statistics about the utilization of memory 110 and resident data cache 202. For example, OS 120 may use various system calls that obtain memory data, such as inode information, or OS 120 may execute a program, such as "free" or "meminfo" to obtain various data about memory 110. Based on this data, OS 120 may then determine a memory pressure for memory 110. The memory pressure may, for example, indicate a percentage that memory 110 or resident data cache 202 has been consumed. Alternatively, the memory pressure may indicate how much of memory 110 or resident data cache 202 remains free for allocation.

In stage 302, OS 120 then prepares a feedback signal that indicates the memory pressure. As noted, OS 120 may prepare this signal in a variety of forms and protocols, such as an asynchronous event, or a software interrupt. OS 120 may also write the feedback signal as data to a file or device that is accessible to applications 210 or 212. In addition to the memory pressure, OS 120 may include timestamp information that indicates when the memory pressure was measured.

In stage 304, OS 120 identifies applications that have registered to cooperate on managing memory 110. In some embodiments, registration by an application may be voluntary. Alternatively, OS 120 may default to providing memory pressure signals to all of the applications unless they specifically opt out on receiving this information.

OS 120 may also determine a relative priority between applications that have registered. For example, when registering, an application may select its own priority. In particular, user interactive applications may select a higher priority, while background applications may use a lower priority. Alternatively, OS 120 may assign each application a priority when it registers. This priority may be statically assigned or dynamically varied. An application's priority may depend on a variety of criteria, such as when it was initiated, the amount of resident data cache 202 that it consumes, the rate at which the application consumes resident data cache 202, etc. Of course other criteria may be used to determine the relative priority between applications, such as first-in-first-out, or round-robin.

In stage 306, OS 120 provides the feedback signal to the registered applications. In some embodiments, OS 120 may be configured to provide this feedback signal to only those applications that registered. As to non-registered applications, OS 120 may assume that it can unilaterally manage the swapping of pages in resident data cache 202 for these applications. Accordingly, embodiments of the present invention can be easily migrated to an operating system, while maintaining backwards compatibility. As noted, OS 120 may provide the feedback signal in various forms, such as an asynchronous event, a software interrupt, or a write to a file or device.

In addition, OS 120 may be configured to provide the feedback signal at various times and at various frequencies. In particular, OS 120 may send the feedback signal at a fixed interval continuously during its operations. Alternatively, OS 120 may normally not send the feedback signal until an event or threshold memory pressure has been reached. For example, OS 120 may commence sending the feedback signal when it senses a spike in workload, such as large file download or when one or more applications have been started.

As another example, OS 120 may commence sending the feedback signal when resident data cache 202 has reached a threshold level, such as 85% allocated, or only 15% free. This threshold level may be set statically or dynamically based on the operating conditions faced by OS 120. The threshold level may be set lower in those instances where the workload has been unpredictable or where the rate of memory consumption has been high. Alternatively, the threshold level may be set higher in those instances where the workload has been predictable or where memory 110 has ample space. As another example, the threshold level may be set so that the feedback signal is sent prior to or shortly after memory management module 200 commences swap operations or page eviction.

In some embodiments, OS 120 may be configured to increase the frequency of the feedback signal as memory pressure increases. For example, OS 120 may be configured to double or triple the frequency of feedback signal after swap operations or page eviction has commenced. OS 120 may use a set of predefined frequencies for the feedback signal or determine the frequency of the feedback signal based on the memory pressure. Of course, other known algorithms for setting the frequency of the feedback signal may be implemented in embodiments of the present invention.

FIG. 4 illustrates an exemplary process flow for an application, such as applications 210 or 212, to cooperate with OS 120 in accordance with embodiments of the present invention. It should be readily apparent to those of ordinary skill in the art that the process flow depicted in FIG. 4 represents a generalized schematic illustration and that other stages may be added or existing stages may be removed or modified. Moreover, for purposes of illustration, it is assumed that application 210 has registered to cooperate with OS 120 and the following now provides an example of some the steps that may be performed.

As shown in FIG. 4, in stage 400, application 210 may receive the feedback signal from OS 120 that indicates the memory pressure on memory 110. As noted, application 210 may receive this signal in the form of an asynchronous event, or based on a software interrupt generated by OS 120. Alternatively, application 210 may be configured to poll a selected file maintained by OS 120 or a device for the memory pressure information.

In stage 402, application 210 determines the memory pressure on memory 110. Application 210 may determine the memory pressure directly from the information in the feedback signal. For example, the feedback signal may indicate that memory 110 has only 15% of its space remaining.

Alternatively, application 210 may determine its own memory pressure based on the feedback signal. In particular, application 210 may calculate a memory pressure based on its own local execution environment. For example, if application 210 is a user interactive application having long wait times, then application 210 may evaluate that 15% remaining in memory 110 is a relatively "low" pressure. In contrast, if application 210 is currently active and requires a large amount of data, then application 210 may evaluate the same 15% remaining in memory 110 as a "high" pressure. As another example, application 210 may interpret the feedback signal as an indication that space in memory 110 is ample. In response, application 210 may increase its utilization and attempt to use more space in memory 110. Accordingly, each application may flexibly determine how to interpret the feedback signal from OS 120.

In stage 404, application 210 may determine the cost of freeing some of virtual memory 212 back to OS 120. In particular, application 210 may calculate the cost of swapping a page from virtual memory 212 between memory 110 and storage 114 versus discarding the page and having processor 102 recalculate the data. In many instances, recalculating the data may result in better performance due to the high cost of I/O between memory 110 and storage 114. Application 210 may also use various algorithms for cache replacement in virtual memory 212, such as Clock, Clock-Pro, least frequently used, and least frequently used with dynamic aging (LFUDA).

In some embodiments, application 210 may be configured to free a certain amount of virtual memory 212 back to OS 120 each time it receives the feedback signal. Alternatively, application 210 may be configured to modulate the amount of virtual memory 212 to free depending on the frequency of the feedback signal. For example, application 210 may calculate the frequency of the feedback signal based on timestamps in the signal. As the frequency increases, application 210 may take more aggressive (i.e., relinquish more of virtual memory 212) actions. Application 210 may escalate its actions in various ways, such as linearly, geometrically, or exponentially, depending upon the increase in frequency of the feedback signal.

In addition, application 210 may escalate depending upon its own nature. For example, if application 210 is a background application that is relatively insensitive to latency, then it may be configured to aggressively free its portions of virtual memory 212. Thus, the individual responses of the applications may vary in embodiments of the present invention.

In stage 406, OS 120 determines which portions of memory 110 and resident data cache 202 can be freed. In some embodiments, OS 120 may be configured to free those pages from applications in which it is cooperating, e.g., application 210. Alternatively, OS 120 may be configured to free pages preferentially. That is, OS 120 may first elect to free pages from applications that have registered for cooperation and then turn to non-registered applications as a secondary or last resort, and vice versa.

In addition, OS 120 may be configured to preferentially free pages among the registered applications. In particular, OS 120 may reference registered application list 208 and determine a priority for each registered application. OS 120 may then free pages from the registered applications based on their priority.

Furthermore, OS 120 may be configured to begin unilaterally free pages of memory 110 and resident data cache 202 in various circumstances. For example, OS 120 may commence unilaterally freeing pages when all of memory 110 has been consumed or when a sharp increase in workload has been detected. OS 120 may then re-initiate cooperation with the registered applications, such as application 210, once workload as stabilized or when space in memory 110 becomes available.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Other embodiments of the invention will be apparent to those skilled in the art from consideration of the specification and practice of the invention disclosed herein.

What is claimed is:

1. A method for a set of applications to cooperate with an operating system, wherein the operating system provides at least one application of the set of applications a virtual memory, and wherein the operating system maps at least a portion of the virtual memory to a physical memory, said method comprising:
   receiving, from the operating system, a feedback signal that indicates a memory pressure on the physical memory, wherein the memory pressure comprises a current utilization of the physical memory by the set of applications;
   determining, by the at least one application of the set of applications, a cost of freeing at least some of its virtual memory based on the memory pressure, the determining comprising:
      estimating an amount of time to swap one or more pages of the virtual memory between the physical memory and a storage device, and
      estimating an amount of time to discard data in the one or more pages of the virtual memory and recalculate the data; and
   releasing, by the at least one application, at least some of its virtual memory based on the cost of freeing and the feedback signal.

2. The method of claim 1, wherein receiving the feedback signal comprises receiving an asynchronous event from the operating system.

3. The method of claim 1, wherein receiving the feedback signal comprises detecting a software interrupt generated from the operating system.

4. The method of claim 1, wherein receiving the feedback signal comprises polling a file.

5. The method of claim 1, wherein receiving the feedback signal comprises polling a device.

6. The method of claim 1, wherein releasing at least some of the virtual memory of the application comprises:
   determining a frequency that the memory pressure has been received; and
   freeing an amount of virtual memory to the operating system based on the frequency of the feedback signal.

7. The method of claim 1, wherein releasing at least some of the virtual memory of the application comprises freeing an amount of virtual memory to the operating system each time the application receives the feedback signal.

8. An apparatus comprising means that are configured to perform the method of claim 1.

9. A computer readable storage medium comprising executable instructions to perform the method of claim 1.

* * * * *